US006966831B2

(12) United States Patent
Miyaki et al.

(10) Patent No.: US 6,966,831 B2
(45) Date of Patent: Nov. 22, 2005

(54) METHOD OF BRANCHING FLOW OF GAME

(75) Inventors: Kazuhito Miyaki, Tokyo (JP); Junichi Fujisaku, Tokyo (JP)

(73) Assignee: Sony Computer Enterrainment Inc., Tokyo (JP)

( * ) Notice: Subject to any disclaimer, the term of this patent is extended or adjusted under 35 U.S.C. 154(b) by 402 days.

(21) Appl. No.: 09/993,345

(22) Filed: Nov. 14, 2001

(65) Prior Publication Data

US 2002/0086724 A1 Jul. 4, 2002

(30) Foreign Application Priority Data

Nov. 15, 2000 (JP) ........................................ 2000-348648
Oct. 1, 2001 (JP) ........................................ 2001-304769

(51) Int. Cl.[7] ................................................. A63F 9/24
(52) U.S. Cl. ............................................ 463/1; 463/37
(58) Field of Search ........................... 463/1, 9, 36–38, 463/43

(56) References Cited

U.S. PATENT DOCUMENTS 4,305,131 A * 12/1981 Best ........................... 345/716
5,568,602 A    10/1996 Callahan et al.
5,607,356 A     3/1997 Schwartz
5,848,934 A    12/1998 Shiels et al.
6,560,763 B1 *  5/2003 Sugiyama et al. ............ 716/13

FOREIGN PATENT DOCUMENTS

EP          0 913 174         5/1999

OTHER PUBLICATIONS

European Search Report dated Sep. 8, 2004.

* cited by examiner

Primary Examiner—Kim Nguyen
(74) Attorney, Agent, or Firm—Katten Muchin Zavis Rosenman

(57) ABSTRACT

Without making such a matter that, for example, a branching point where the flow of a game story is branched is notified to the user, the user is let so as to detect a timing for a hidden branching point to be present, and in dependence on whether the detection of the branching point is right or wrong, the story has a varied subsequent development.

16 Claims, 11 Drawing Sheets

METHOD OF BRANCHING FLOW OF GAME

This application is related to Japanese Patent Application No. 2000-348648 filed on Nov. 15, 2000 and No. 2001-304769 filed on Oct. 1, 2001 based on which this application claims priority under the Paris Convention and the contents of which are incorporated herein by reference.

BACKGROUND OF THE INVENTION

1. Field of the Invention

The present invention relates to a story branching control method, a notification signal generating method, a program executing apparatus, a record medium having recorded therein a processing program, and a processing program, to be preferable for a game system such as a video game in which, for example, a story is branched.

2. Description of the Related Art

In recent years, in which entertainment apparatuses such as video game machines have been spread, the player is allowed to enjoy a variety of games by having an entertainment apparatus execute a game application program obtained via a record medium such as a CD-ROM or DVD-ROM or a communication medium such as a communication line or network. In a game application program such as an RPG (roll playing game), an AVG (adventure game), or an SLG (simulation game), a story is advanced in accordance with a player's instruction received via a controller connected to an entertainment apparatus, whereas the game application program is adapted to respond to the content of the player's instruction by changing the content of the story to be developed thereafter. Therefore, in a story branching game of this kind, the player can enjoy a variety of developments of story in accordance with the content of one's own instruction.

Typically, a story branching game of such a kind is adapted for a television monitor apparatus to display on a monitor screen thereof a game image frame indicating a picture (a preformed game picture) representing a developed story in accordance with the content of a player's instruction, a select image frame (such as of selective actions or lines) for a development of story to be selected by a player via a controller, and such a title image frame as for a narration to be indicated of a picture in the game picture frame, as necessary. In the case of such a game as having a nature of an action game, for example, in a game application program, besides the selective development of a story, there is displayed an instruction image frame such as of arrow marks and buttons operative by a player. If operations are performed by the player as indicated from the game application program, as the operations are successful, the game application program makes the story advance. On the other hand, to the contrary, if the player has failed in operation, the game application program counts the mistake. Further, the game application program is adapted, for example, to make the game over with a count of mistakes having reached a predetermined number, or to come to an end immediately after the failure.

In the course described, in which a select image frame is displayed for a player to select a story's development and the story of game is changed in accordance with a picture selected from inside the select image frame by the player, it however so occurs that the player is caused to recognize what he or she has selected, and is allowed to predict a subsequent development of the story to some extent. There may thus be resulted a degradation of such an unexpectedness that an unknown story may be experienced.

Further, in the story branching game described, which is adapted at a branching point where the story's development is branched, to display the select image frame as well as the title image frame or the like and to make a request for selections corresponding thereto, it so follows that a player who wants to enjoy, for example, a flow of the story is precluded in the enjoyment. On the other hand, for a player who wants to enjoy branching a story's development, as the concentration on a game image frame is thinned when the select image frame is not displayed, it is difficult to play a game with a tensioned feeling.

SUMMARY OF THE INVENTION

The present invention has been made with such points in view. It therefore is an object of the present invention to provide an story branching control method, a notification signal generating method, a program executing apparatus, a record medium having recorded therein a processing program, and a processing program, allowing for a game to be implemented with unexpectedness, a high gameness to be realized, a satisfiable flow of story, and a tensioned feeling.

According to the present invention, a search for a branching point provided on a way of a flow of story is made within a predetermined period of time from a search instructing input, to determine a branch destination in accordance with the result of the comparing between the branching point and the point of the search instructing input, or with a predetermined variant value.

Moreover, according to the present invention, also when the branching point is reached by a flow of story within a period excluding the predetermined period of time, the branch destination is determined in accordance with the predetermined variant value.

Further, according to the present invention, when the branching point is passed by the flow of story within the period excluding the predetermined period of time, there is generated a predetermined pass notification signal notifying that the branching point is passed.

Therefore, according to the present invention, without making such a matter that, for example, a branching point where the flow of a game story is branched is notified to the user, the user is led so as to detect a timing for a branching point to be present, and in accordance with the result of the comparing between the branching point and the point of the search instructing input, the story has a varied subsequent development.

Other and further objects and features of the present invention will become obvious upon understanding of the illustrative embodiment about to be described in connection with the accompanying drawings or will be indicated in the appended claims, an various advantages not referred to herein will occur to one skilled in the art upon employing of the invention in practice.

BRIEF DESCRIPTION OF THE ACCOMPANYING DRAWINGS

DETAILED DESCRIPTION OF THE PREFERRED EMBODIMENTS

Entire Arrangement of the Entertainment System According to the Invention

Figure 1:
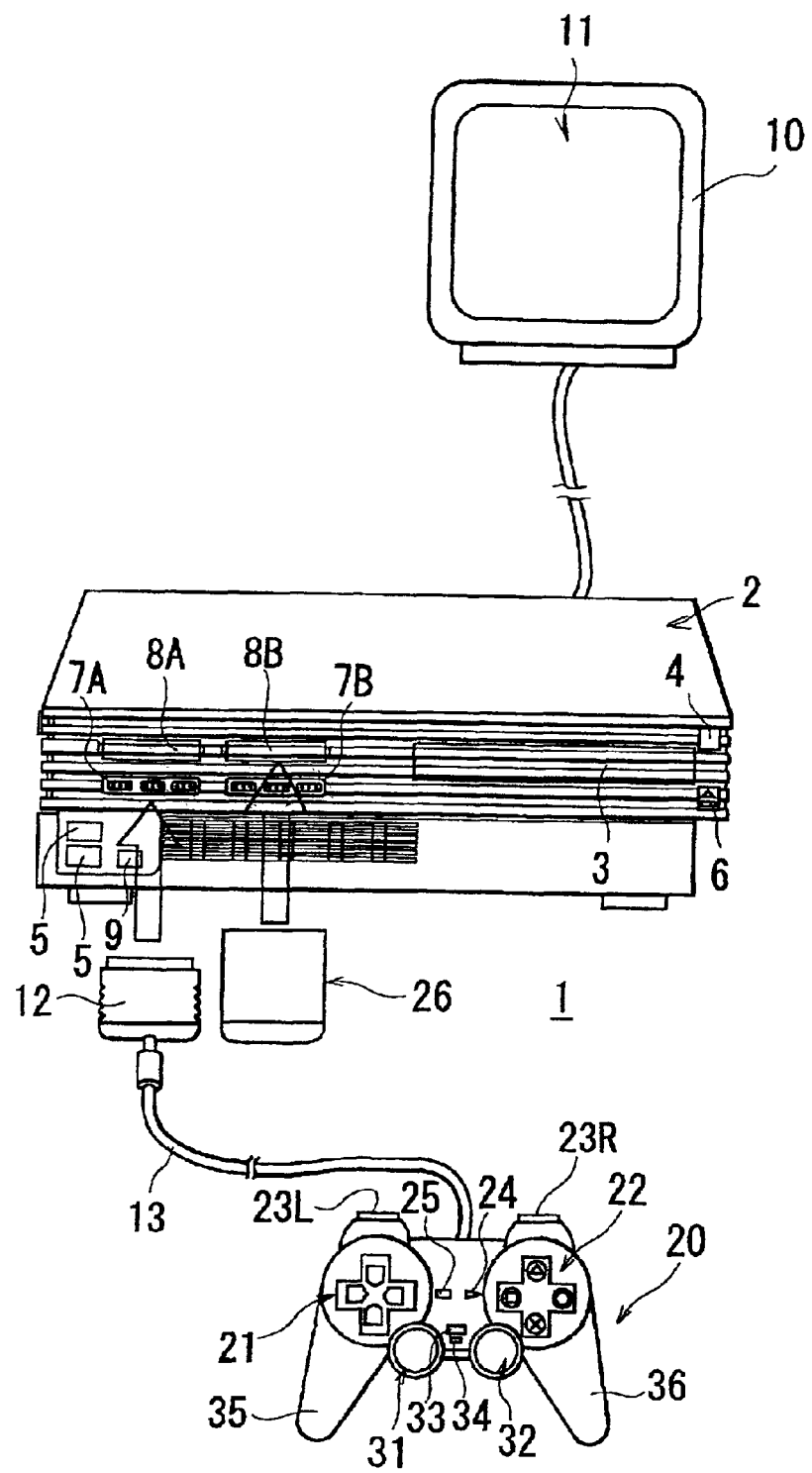
FIG. 1 is an illustration showing schematic arrangement of an essential portion of an entertainment system according to an embodiment of the present invention.

FIG. 1 shows a schematic arrangement of an entertainment system as an embodiment (for example, a video game) of the invention.

An entertainment system 1 shown in FIG. 1 is a video game system formed by an entertainment apparatus 2 as an example of a program executing apparatus according to the invention, a controller 20 as an operation terminal to be operated by the user (or player), and a television monitor apparatus 10 which visualizes the content of a game and outputs sounds in the game.

Brief on the Entertainment Apparatus

The entertainment apparatus 2 has memory card slots 8A, 8B for a memory card 26 to be attachable thereto and detachable therefrom, controller ports 7A, 7B for a connector 12 of a cable 13 of the controller 20 to be attachable thereto and detachable therefrom, a disc tray 3 for application of an optical disc, such as a DVD-ROM or CD-ROM, an open button 6 for opening the disc tray 3, an on/standby/reset button 4 for rendering a power supply on, in standby, or reset, an IEEE (Institute of Electrical and Electronics Engineers) 1394 connection terminal 9, USB (Universal Serial Bus) connection terminals 5, etc.

Though not depicted, the entertainment apparatus 2 has at the back side, a power supply switch, an audio video output terminal (AV multiple output terminal), a PC card slot, an optical digital output terminal, an AC power supply input terminal, etc.

The entertainment apparatus 2 is adapted to execute a game in accordance with instructions from the player via the controller 20, and a game application program read from the optical disc, such as a CD-ROM or DVD-ROM, a semiconductor memory or the like, or the game application program down-loaded via a variety of communication lines, such as a telephone line, LAN, CATV line, and communication satellite line. It is noted that the execution of a game means advancing the game by controlling, mainly in response to instructions from the player via the controller 20, a picture (game picture) in a game image frame displayed on a screen 11 of the television monitor 10, as well as sounds (game sounds) of an audio apparatus, connected to the entertainment apparatus 2. In the case of entertainment apparatus 2 shown in FIG. 1, the controller ports 7A, 7B allow connection of two controllers 20 so that, by use of the two controllers, two players can perform a variety of games. The memory card 26 to be attached to the memory card slots 8A, 8B allows storage (or saving) of various game data arising from execution of a video game, for example.

The entertainment apparatus 2 is adapted, not simply for execution of a video game in accordance with the game application program, but also for reproduction (decoding) of video and audio data recorded in a DVD or audio data recorded in a CD, for example, as well as for actions to be made in accordance with other various application programs.

Brief on the Controller

The controller 20 has a left grip part 35 to be gripped, as it is involved, by the palm of the left hand of an operator (player) of the controller 20, a right grip part 36 to be gripped, as it is involved, by the palm of the right hand, a left operation part 21 and a right operation part 22 to be operated by the thumbs of the left and right hands, as the grip parts 35, 36 are gripped by the left and right hands of the player, a left analog operation part 31 and a right analog operation part 32 adapted for analog operations (joystick operations) by the same left and right thumbs, a left first pushdown button 23L and a right first pushdown button 23R to be pressed down for operations by the left and right first fingers, respectively, and a left second pushdown button and a right second pushdown button (both not shown) provided under the left and right first pushdown buttons 23L, 23R, respectively, to be pressed down for operations by the left and right second fingers, respectively. The left operation part 21 is provided with "up", "down", "left", and "right" orientation keys to be used when the player performs operations such as for movements, such as in "up", "down", "left", and "right" directions on an image frame, of game characters, for example, and on the other hand, the right operation part 22 is provided with four indication buttons ("Δ", "□", "×", and "○" buttons) which have different functions respectively allotted by the game application program, such as setup and execution of functions of game characters, for example. In particular, in the present embodiment, search start indication functions of later-described story branching points are allotted to the "Δ" buttons.

Further, the controller 20 has a mode select switch 33 for performing selection of operation modes to start or stop functions of the left and right operation parts 21, 22 and the left and right analog operation parts 31, 32, a lighting display part 34 for causing the player to recognize a selected operation mode by a lighting display such as of an LED (light emitting diode), a start button 24 for indicating reproduction or temporal stop, a select button 25 for performing an indication or the like to have a menu or operation panel displayed on the monitor screen 11, etc.

When such various buttons and operation parts are operated, the controller 20 is adapted to generate operation signals corresponding to their operations, and transmit them to the entertainment apparatus 2 via the cable 13.

Still further, the controller 20 has, in each of the left and right grip parts 35, 36, a vibration generating mechanism in which, for example, a weight eccentrically offset relative to a rotation axis of a motor is rotated by the motor to thereby generate vibrations, and which is operative in response to an indication from the entertainment apparatus 2. It thus has also a function of transmitting vibrations to the hands of the player by operation of the vibration generating mechanism.

Internal Arrangement of the Entertainment Apparatus

Figure 2:
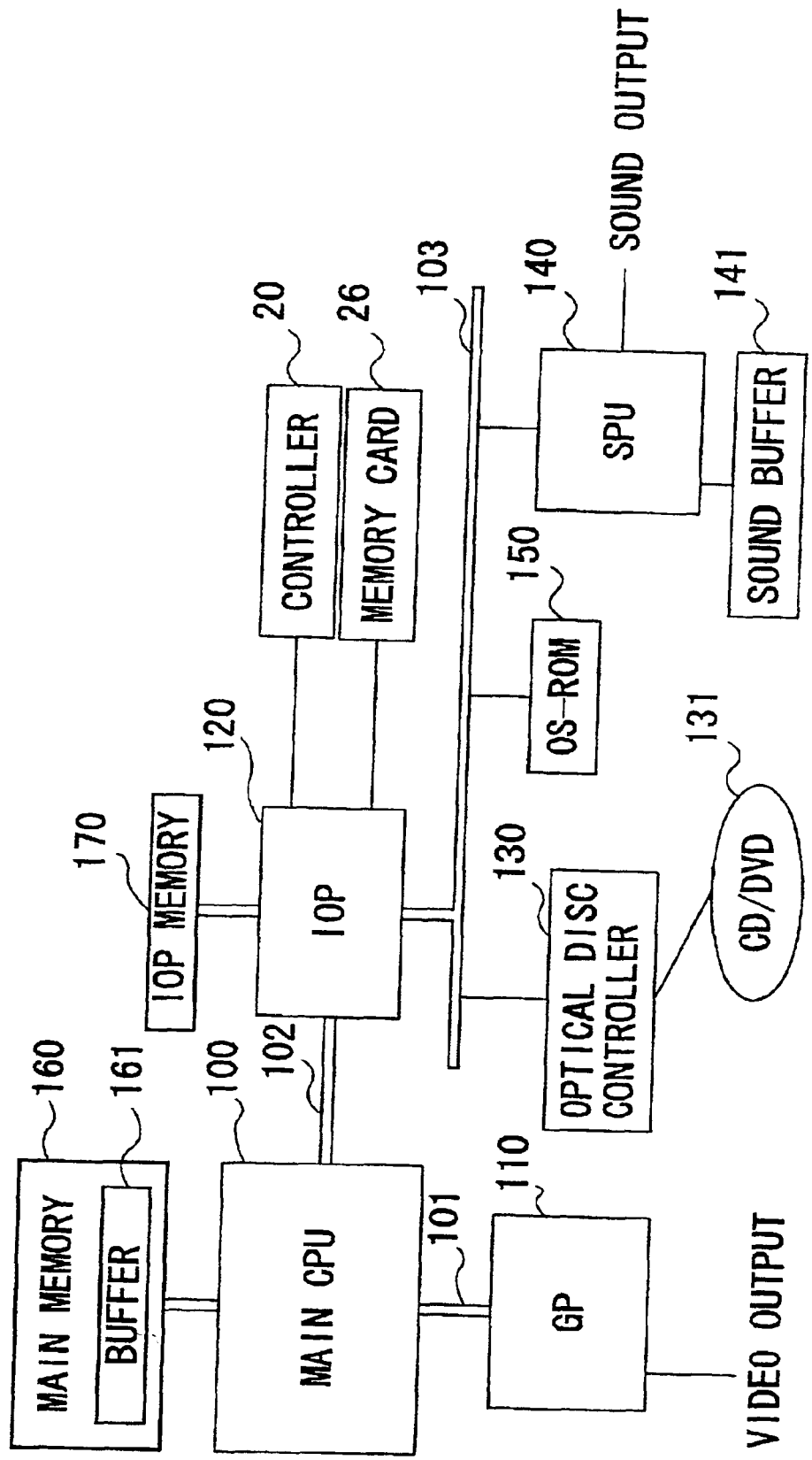
FIG. 2 is a schematic block diagram showing internal arrangement of an entertainment apparatus of the embodiment.

Description is now made of schematic arrangement of internal circuitry of the entertainment apparatus 2 of the embodiment, with reference to FIG. 2.

The entertainment apparatus 2 of the embodiment has as basic arrangement a main CPU 100 for performing control of elements of the internal arrangement as well as processing signals in accordance with various programs such as a later-described game application program of the embodiment, a graphic processor (GP) 110 for performing a graphic processing, an IO processor (IOP) 120 for performing an interfacing process between external and internal of the apparatus, an optical disc controller 130 for controlling reading of the optical disc, such as DVD or CD, in which application programs and multi-medium data are recorded and for decoding the read data, a main memory 160 including a work area of the main CPU 100 and a buffer 161 for temporary storage of read data from the optical disc 131, an IOP memory 170 for holding commands and data to be executed by the IO processor 120, an OS-ROM 150 for storing an operating system program to be executed mainly by the main CPU 100 and the IO processor 120, and a sound processor unit (SPU) 140 for performing a sound signal processing.

The main CPU 100 and the graphic processor 110 are interconnected by a dedicated bus 101, and the main CPU 100 and the IO processor 120 are interconnected by an SBUS 102. The IO processor 120 and the optical disc controller 130, OS-ROM 150, and sound processor unit 140 are interconnected by an SSBUS 103.

The main CPU 100 controls whole actions of the entertainment apparatus by execution such as of various programs, including the game application program of the embodiment, which are read from the optical disc 130 and loaded in the main memory 160 or down-loaded via communication networks. The IO processor 120 performs controlling input and output such as of data from the memory card 26 for storage such as of game settings and of signals from the controller 20 where the player's instructions are input, and input and output of data such as at the unshown USB connection terminal, IEEE 1394 connection terminal, and PC card slots, as well as data protocol conversion, etc.

The graphic processor 110 responds to a frame drawing instruction from the main CPU 100 by drawing an image frame, and stores a drawn image frame in a frame buffer (not shown) The graphic processor 110 has a function of a geometry transfer engine for performing processes such as a coordinate transformation. The geometry transfer engine is adapted to form an imaginary three-dimensional object by a set of triangular polygons, when an application program such as for a game recorded in the optical disc 131 for example makes use of a so-called three-dimensional graphic, and performs various calculations for generating an image frame to be obtained by photographing the three-dimensional object by an imaginary camera, that is, such as a perspective transformation in the rendering (a calculation of coordinate values in the case vertices of respective polygons constituting the three-dimensional object are projected on an imaginary camera screen). The graphic processor 110 follows a frame drawing instruction from the main CPU 100 to perform, making use of the geometry transfer engine, as necessary, the rendering of a three-dimensional object relative the frame buffer, thereby preparing an image frame. Then, it outputs a video signal representing the image frame.

The sound processor unit 140 has, for example, such functions as an ADPCM decoding function of reproducing an adaptive prediction coded audio data, a reproducing function of reproducing waveform data stored in a sound buffer 141 to thereby reproduce and output audio signals such as an effect sound, and a modulating function of modulating, to reproduce, waveform data stored in the sound buffer 141. By provision of such functions, the sound processor 140 is configured to be used as a so-called sampling sound source for generating an audio signal, such as an instrument sound or effect sound, from waveform data stored in the sound buffer 141.

In the entertainment apparatus 2 configured as described, for example when the power supply is thrown in, there are read an operating system program for main CPU and an operating system program for IO processor respectively from an OS-ROM 150, which operating system programs are then executed at the main CPU 100 and the IO processor 120. The main CPU 100 is thereby adapted to execute general control of respective parts of the entertainment apparatus 2. Further, the IO processor 120 is adapted to control inputs and outputs of signals, such as to and from the controller 20 and memory card 26. The main CPU 100 in execution of the operating system program, past an initialization process such as action checks, controls the optical disc controller 130 to read an application program, such as of a game, recorded in the optical disc 131. Then, the main CPU 100, having loaded in the main memory 160, executes the game application program. By execution of this game application program, the main CPU 100 is adapted to control the graphic processor unit 110 as well as the sound processor unit 140 in response to the player's instruction received from the controller 20 via the IO processor 120, thereby controlling display of image frames as well as generation of effect sounds and instrumental sounds.

Video Game According to the Embodiment

Brief on the Game

There will be described a brief on a video game the entertainment apparatus 2 is to perform on basis of a game application program according to the present embodiment.

The video game according to the present embodiment is a game in which a story is branched to provide various flows of story to be enjoyed, and is different from games in which, like a conventional game, a story branch is selective simply by a selection image frame displayed on a monitor screen, such that, besides the selection of a story branch by a selection image frame, it also is possible, with no selection image frame displayed, for the player to detect a story branching point (by an own search) to thereby change the development of story.

In other words, according to the present embodiment of video game, as it is compared with a game so easy of prediction of story development as by a story branch selective from a displayed selection image frame like a conventional story branching game, there is a difficulty in prediction of a subsequent story development, allowing for an unexpectable game to be implemented, without accompanying such a hindrance to the flow of story that otherwise might have been caused by displaying a selection image frame.

Figure 3:
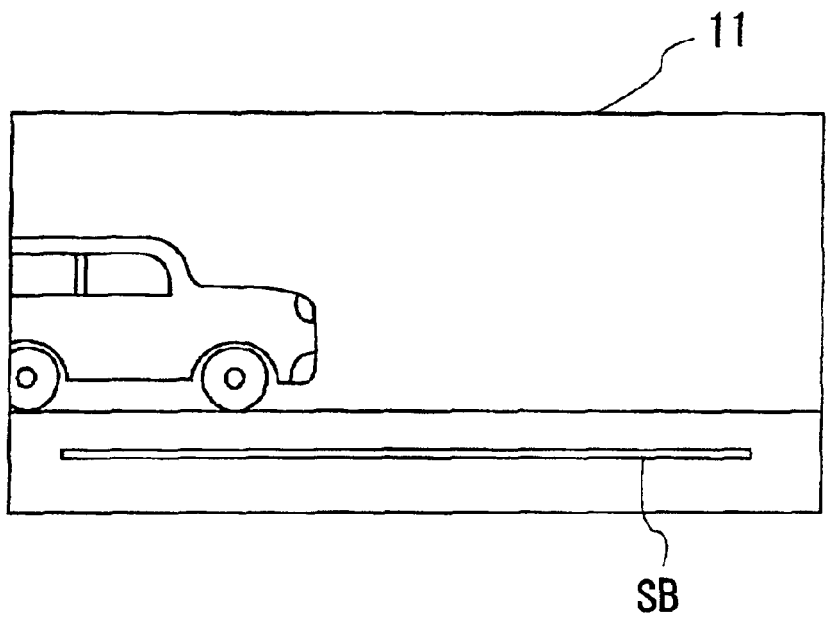
FIG. 3 is an illustration for explanation of an example of display of a search bar by startup of a search system.

In the present embodiment of video game, as a search button for the player to instruct a timing for a search for the above-noted story branching point, a predetermined button (for example, "Δ" button in this embodiment) on the controller 20 is allotted. If the search button ("Δ" button) is pressed down during progress of the story, there is made a search for a story branching point for a predetermined period of time, and if a story branching point is present in the predetermined period of time, the story is automatically branched. While the search for a story branching point is being made, there is displayed, as illustrated in FIG. 3, a search bar at a predetermined position on the monitor screen (in the example of FIG. 3, a horizontal search bar SB in a lower part of the image frame), informing the player of the search being made, by indication such as of the search bar SB having, for example, indication elements thereof sequentially lighted in brightness, as the position moves from left to right or from right to left. It is noted that the search bar SB has a changed color in accordance with the number of later-described game points.

Figure 4:
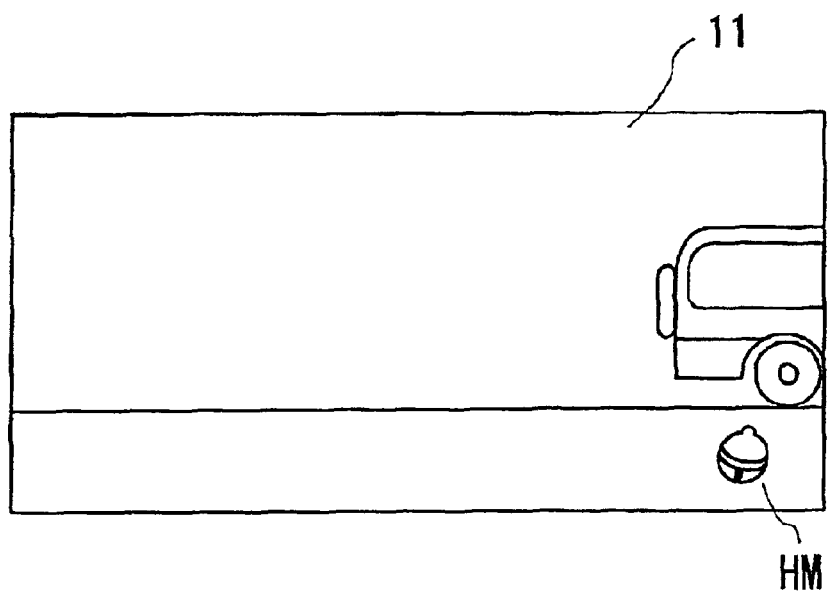
FIG. 4 is an illustration for explanation of an example of display of a hint mark.

In the present embodiment of video game, when the player has passed a story branching point without pressing the search button, as illustrated in FIG. 4, the monitor screen 11 has a hint mark indicated at a predetermined location thereon (in the example of FIG. 4, an illustration of bell is indicated as a hint mark HM in a right lower part of the image frame.), and a sound representing the indication of hint mark is output. The player can know having passed the story branching point from the indicated hint mark HM and the output sound, and take these as a reference when instructing a search for a story branching point in the next time of playing the game. It is noted that such a hint mark indication with sound output is allotted simply to, for example, about eighty percent of a total number of story branching points in the game, and not allotted to all story branching points. The present embodiment of video game thereby has an increased degree of difficulty to search a story branching point.

In the present embodiment of video game, there is programmed an increment or decrement of game point, such as depending on a success or failure in a search for a story branching point or by the selection of a particular story branching point, with an influence on the story branching thereafter. The success in a search for a story branching point means a case in which a story branching point exists within a predetermined period of time after the search button is pressed. On the other hand, the failure in a search for a story branching point means a case in which no story branching point exists within the predetermined period of time after the search button is pressed, or in which the search button is not pressed to thereby give an instruction for starting a search even though a story branching point exists. The number of game points has an influence on the branching of a subsequent story, for example, such that the branching has an increased tendency to branch into a story of worse conclusion with an increased number of game points, or contrary thereto, an increased tendency to branch into a story of better conclusion with a decreased number of game points. The number of game points will hereafter be called "bad point". Moreover, in the present embodiment of video game, the leading name of game story has a risen bad level with an increased bad point, or contrary thereto, a fallen bad level with a decreased bad point, so that the branching of a subsequent story is influenced by a resultant bad level. Further, in the present embodiment of video game, while the bad point is small (the bad level is low), the search bar SB has a green color for example, and as the bad point increases (the bad level rises), the color of search bar SB is changed from the green, to a yellow, an orange, and a red.

As described, in the present embodiment of video game, not simply by a success but also by a failure in a search for a story branching pint, the branching of a subsequent story is influenced, whereby, for example, it is prevented to have an advantage in progress of game (to go toward a story of better conclusion), such as by making a search for a story branching point by repeating operation of the search button. Therefore, according to the present embodiment of video game, as it is compared with such a simple game that, like a conventional story branching game, a story branch is selective merely when a selection image frame is displayed, it is possible to play a game anytime with a tensioned feeling. Further, according to the present embodiment of video game, the search bar SB has a changed color depending on a bad point, whereby the player is allowed to grasp the bad point by the sense, with the more tensioned feeling on the game.

Outline of Architecture of an Embodiment of Game Application Program

Description will now be made of the architecture of a game application program for implementation of the above-described embodiment of video game.

Figure 5:
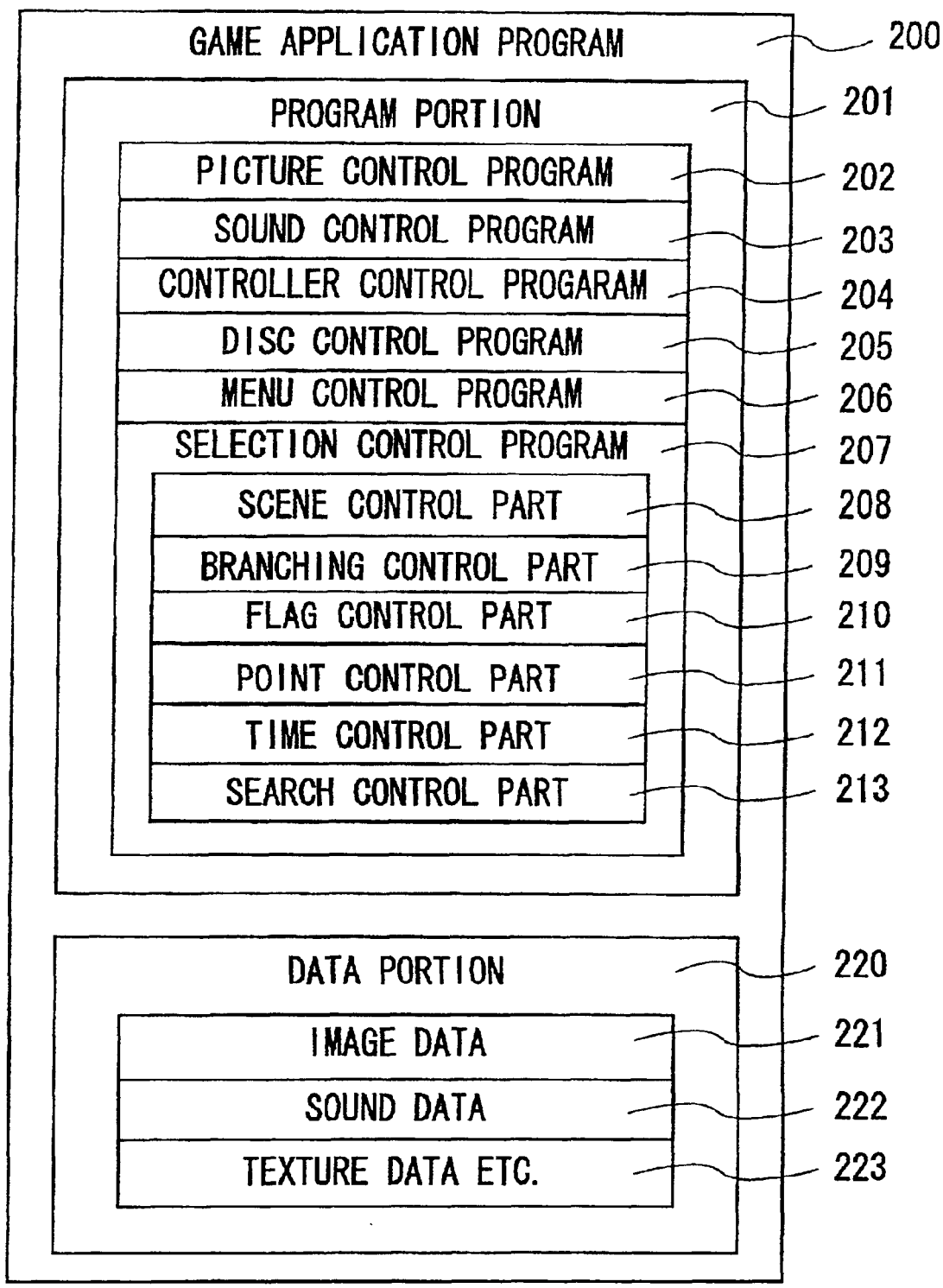
FIG. 5 is a diagram for explanation of a data format of a game application program of the embodiment.

The present embodiment of game application program is adapted to be down-loaded via a communication line, or to be recorded on a recording medium, such as the optical disc 131 such as a DVD-ROM or CD-ROM, and has such a data format as shown in FIG. 5. It is noted that the data format of FIG. 5 conceptually represents a program portion, as well as the remaining data portion, contained in the present embodiment of game application program, and does not illustrate an actual program architecture.

As shown in FIG. 5, the present embodiment of game application program 200 is roughly dividable into a program portion 201 to be executed by the main CPU 100 of FIG. 2, and a data portion 220 constituted with data on story images and sounds to be reproduced in execution of the present embodiment of video game, and texture and picture effect processing data.

In the data portion 220, image data 221 and sound data 222 are compressed data conforming, for example, to the MPEG (Moving Picture Image Coding Experts Group), which are divided to be prepared, for example, for every scene and for every section between story branching points. Texture data etc. 223 refer to texture data else than the MPEG image data 221 and the sound data 222, factor data for the image data to be thereby multiplied when performing various picture effect processes, and the like.

The program portion 201 includes a picture control program 202 for displaying a game picture on the monitor screen 11, a sound control program 203 for outputting game sounds, a controller control program 204 for controlling those action and input signals of the controller 20 which are peculiar to the present embodiment of video game, a disc control program 205 for controlling reading data from the optical disc 131 in accordance with progress of the present embodiment of video game, a menu control program 206 for controlling display of later-described menu image frames and information of menu select instructions, and a selection control program 207 for controlling the story branching and search information.

The selection control program 207 includes a scene control part 208 for performing controls such as of reproduction of respective scenes constituting a story, a branching control part 209 for controlling information on the branching of story, a flag control part 210 for controlling later-described flag information to be used in the branching of story, a point control part 211 for controlling information on the bad point, a time control part 212 for controlling time information such as a search time, and a search control part 213 for controlling search information in accordance with search instructions from player.

Flow in Execution of the Embodiment of Game Application Program

Figure 6:
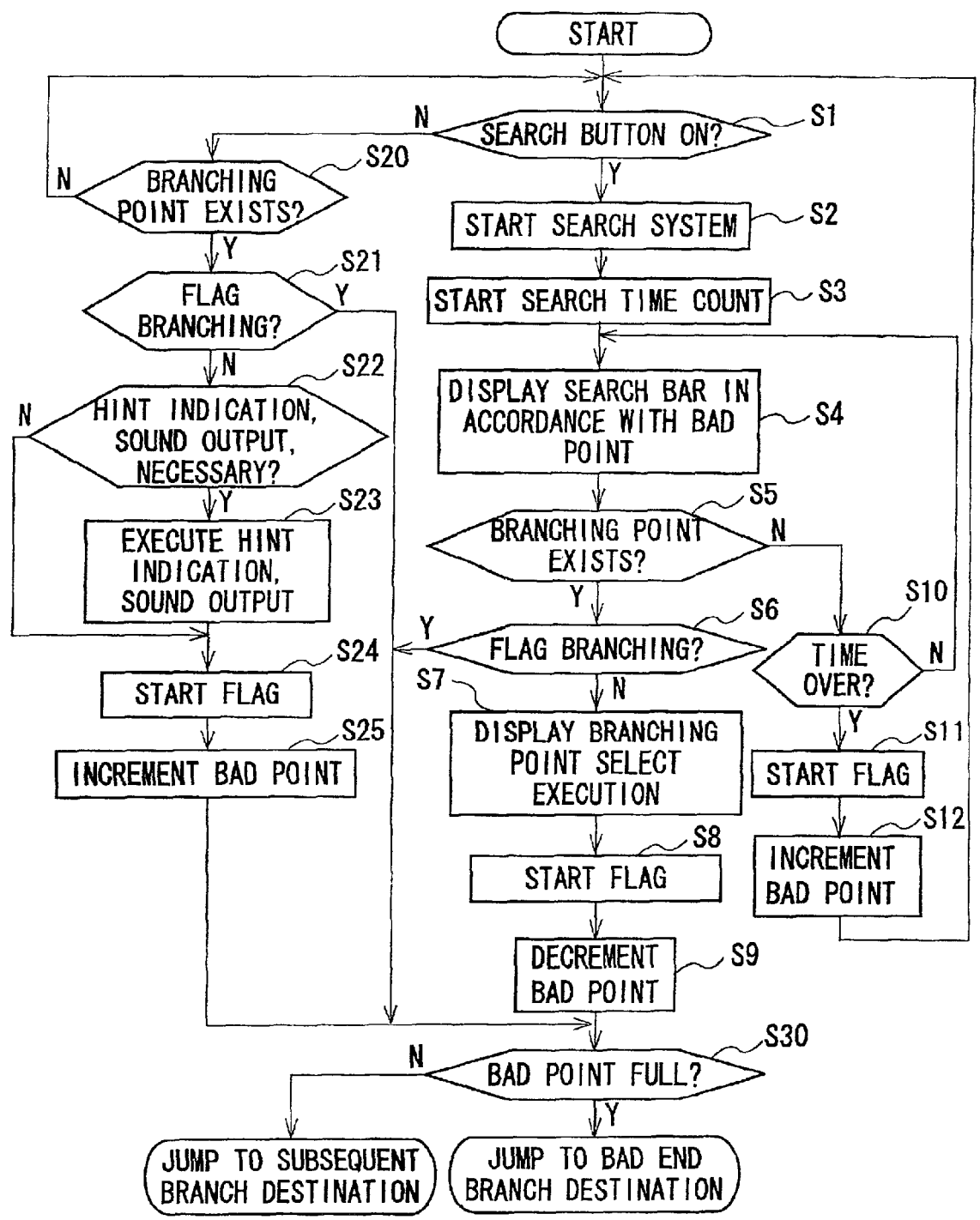
FIG. 6 is a flowchart showing the flow of processes in the game application program of the embodiment.

The flow of processing in the above-noted present embodiment of game application program shown in FIG. 5 is described below with reference to a flowchart shown in FIG. 6. It is noted that the below-described flow is implemented by the respective program parts constituting the present embodiment of game application program, as they are operating on the CPU (central processing unit) incorporated in the entertainment apparatus 2 of FIG. 1. The description below is simply made of those story branching operations which are characteristic to the present invention.

In the present embodiment of game application program 200, the controller control program 204 supervises whether or not a search button ("Δ" button in this embodiment) on the controller 20 is pressed, as a process at a step S1, during progress of the video game. The branching control part 209 supervises whether or not a story branching point exists in an advancing game story, as a process at a step S2.

In the case it is detected at the step S1 that the search button is pressed, the flow goes to the step S2, where the process is handed over to the search control part 213. As the flow has come to the step S2, the search control part 213 starts a search system, when at a step S3 the time control part 212 starts counting the predetermined search time. Then, at a step S4, the search control part 213 requests the picture control program 202 to have the search bar SB displayed in a color in accordance with a bad point controlled by the point control part 211.

While the search is made, at a step S5, the branching control part 209 detects whether or not a story branching point exits, and at a step S10, the time control part 212 makes a decision on whether or not the search time is over.

At the step S10, if the time control part 212 decides that the search time is over, then at a step S11, the flag control part 210 sets up a flag to be used for a decision of branch destination in a subsequent story branching, and at a step S12, the point control part 212 increments the bad point b a predetermined value. That is, in this case, no story branching point is found by an ON operation of the player to the search button, and therefore the step S11 sets up, as the branching flag, a flag for the story development to go worse, and the step S12 increments the bad point so that the subsequent story branching has an increased tendency for the story development to go worse. It is noted that the value of increment of bad point at the step S12 may be constant, or variable by branching points, scenes, or cuts.

On the other hand, while the search is made, in the case the branching control part 209 detects a story branching point at the step S5, the flow automatically goes from the detected story branching point to a story at a branch destination. Then, at a step S6, if it is decided that the story branching point is a branching point for flag branching, the flow goes to a story at a branch destination in accordance with a branching flag set at the flag branching point, and unless the branching point is decided as a branching point for flag branching, the flow goes to a story at a branch destination preset at the branching point.

While the search is made, in the case in which a story branching point is detected at the step S5 and the branching point is not decided as for flag branching at the step S6, then as a process at a step S7, the picture control program 202 employs a factor data for particular effect process and the like prepared in advance in the texture data etc. 223 of the data portion, to provide a particular effect process such as ripples on an image to be displayed. In other words, in the present embodiment of video game, while the search is made, if a story branching point is detected, the image has a particular effect process such as ripples provided thereon, whereby it is notified to the player that a story branching point can be detected.

Then, as the flow goes to a process at a step S8, the flag control part 210 starts a branching flag, as necessary, and as a process at a step S9, decrements the bad point. That is, in the case in which a story branching point can be found during the search by the player's instruction, it so follows in the present embodiment of video game that the branching flag to be set at the step S8 is such a flag as for the story to go better for example, and also at the step S9, the bad point is made to decrement by a predetermined value, to thereby have an increased tendency for the subsequent story development to go better. It is noted that the value of decrement of bad point at the step S9 may be constant, or variable by branching points, scenes, or cuts.

Thereafter, the point control part 212 makes, as a process at a step S30, a decision on whether or not a current value of the bad point has not reached a preset maximum, and if the bad point value has reached the maximum, the story development is caused to jump to a bad ended branch destination. On the other hand, unless the bad point value has reached the maximum, the flow goes to a scene of a story at a branch destination in accordance with the branching flag or bad point, or at a preset branch destination.

If the search button has not been pressed at the step S1 when the presence of a story branching point is detected at the step S20, then at a step S21, the branching control part 209 makes a decision on whether or not the story branching point is a branching point for flag branching. In the case the branching point is decided as for flag branching, then the flow goes to a process at the step S30, where the branching control part 209 is responsible for the current value of bad point to jump to a story at a bad ended branch destination or at a branch destination in accordance with the branching flag.

In the case in which the decision at the step S21 is not for flag branching and it is decided at a step S22 that the story branching point is a branching point where the setting of hint mark and sound output is made, then at a step S23, the picture control program 202 controls the texture data etc. 223 of the data portion 220 to perform an indication on the monitor screen 11, such as of the hint mark HM shown in FIG. 4, and the sound control program 203 has a sound output accompanying the hint mark indication at the sound processor unit 140. Thereafter, the flow goes to a process at a step S24.

In the case in which it is not decided at the step S22 that the story branching point is a branching point where the setting of hint mark and sound output is made, then the flow passes by the process at the step S23, to directly go to the process at the step S24.

As the flow has come to the process at the step S24, the flat control part 210 starts a branching flag for the story development to go worse, and the point control part 211 makes, as a process at a step S25, an increment of bad point. That is, in this case, although a story branching point is present, the player is unable to know the presence, and at the step S24, there is set up as a branching flag the flag for the story development to go worse, and also at the step S25, there is made the increment of bad point so that the subsequent story branching has an increased tendency for the story development to go worse.

Past the step S25, the flow goes to the process at the step S30, where as described the current value of bad point is based on to jump to a story at a bad ended branch destination or at a branch destination in accordance with the bad point value.

Concrete Example of Video Game

Method of Starting and Operating the Game

The flow of a concrete video game to be implemented by the above-noted present embodiment of game application program is described below with reference to FIG. 7 to FIG. 13.

First, by turning on a power switch provided at the back side of the present embodiment of entertainment apparatus 2 and further by setting to the disc tray 3 the optical disc 131 on which the present embodiment of game application program is recorded, there is displayed a main title on the screen 11 of the television monitor 10. While the main title is displayed, by pressing the start button 24 of the controller 20 connected for example to the controller port 7A, the present embodiment of video game is started. Then, if a saved data for the present embodiment of video game is stored in the memory card 26 inserted in the memory card slot 8A (a memory card slot corresponding to the controller port 7A connected to the controller 20), there is displayed a phrase "Continue Yes No" on the monitor screen 11. At this time, if for example the "Yes" side is selected, the player can play a continuation of last data. On the other hand, if the "No" side is selected, there is displayed a main menu on the monitor screen 11. Also in the case the saved data is not stored in the memory card 26, there is displayed the main menu.

Figure 7:
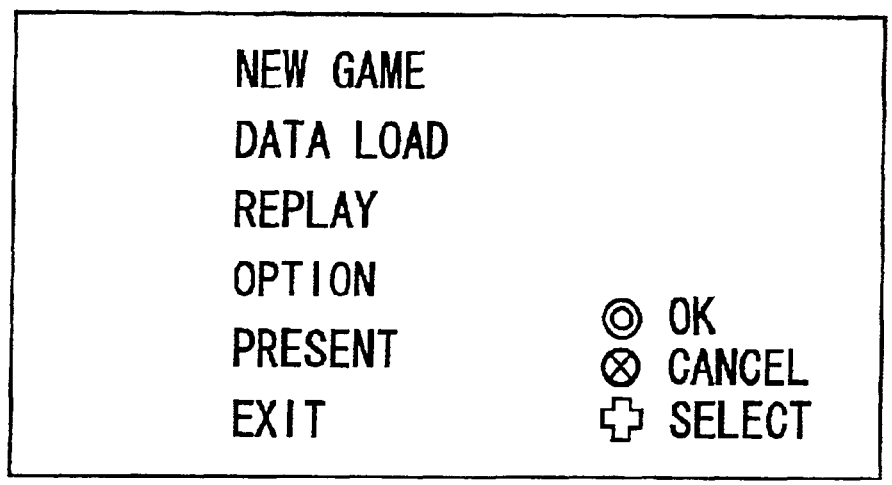
FIG. 7 is an illustration for explanation of a main menu.

The main menu has such menu items as shown in FIG. 7 for example.

"New Game" is an item for starting a play from a start of a story of the present embodiment of video game. "Data Load" is an item for loading a saved data from the memory card inserted in the memory card slot to start a play from continuation. "Replay" is an item for loading a saved data from the memory card inserted in the memory card slot to perform a replay reproduction up to the time of a last saving. It is noted that a game end is selective from a later-described pause menu to finish the replay reproduction. "Option" is an item for changing various settings on the game. "Present" is an item for appreciation of various favors that appear when a particular condition is met. "Exit" an item for returning to the main menu. It is noted that, in such a case that a story of the present embodiment of video game is divided for example into a first and a second volume, the second volume for example may have a main menu including a "Continue" item as well. The "Continue" item is for loading a saved data of the first volume saved in the memory card inserted in the memory card slot to start a play from a continuation of the first volume.

When, as described, the power supply of the present embodiment of entertainment apparatus 2 is turned on and the present embodiment of game application program is loaded, the following functions are allotted to operation parts and buttons of the controller 20. For example, a left second pushdown button has an identical function to the "□" button allotted thereto, and a left first pushdown button of the controller 20 has an identical function to the "○" button allotted thereto. To the "○" button is allotted a function for instruction of a decision, such as on a selected menu item, or paging. It is noted that, in such a case that a story of the present embodiment of video game is divided for example into a first and a second volume, a function for instruction of decision may be allotted to a "○" button in the first volume, and functions for paging and instruction of decision may be allotted to a "○" button in the second volume. The paging however is enabled simply at a briefing part of a preamble of a story to be reproduced at a start of the second volume for example, and the paging does not function when starting a play after loading a saved data of the first volume saved in the memory card by the "Continue" item. To "Up", "Down", "Left", and "Right" direction keys, a right first pushdown button, and a right second pushdown button are allotted functions for selection of menu items such as of the main menu and a later-described pause menu. To the "□" button is allotted a function for instruction of a history in the past, and to the "Δ" button is allotted a function of starting the search system of story branching point. To the "×" button is allotted a function for instruction of a skip or cancellation, while the right analog operation part is unusable for example. To the start button is allotted a function for instruction to display a pause menu. If the start button is pressed for example during the game or replay reproduction, a later-described pause menu is displayed at a cut of a right subsequent scene. As another function in the present embodiment of video game, there is a vibration function in a vibration generating mechanism of the controller 20, which can be set to ON and OFF, irrespective of whether the lighting indicator 34 is lit or distinct, by a "Vibration" item provided for example under a later-described "Option" item in the main menu or pause menu.

Figure 8:
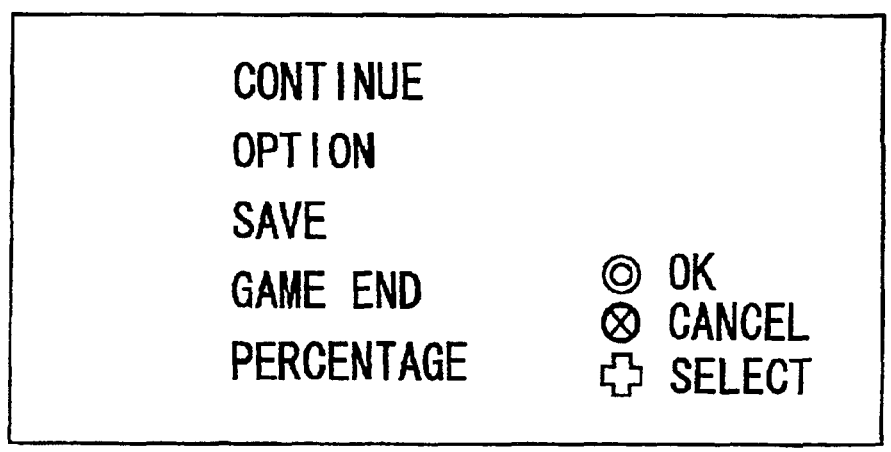
FIG. 8 is an illustration for explanation of a pause menu.

The pause menu has such menu items as shown in FIG. 8 for example.

"Continue" on the pause menu is an item for returning to the game. "Option" is an item for various settings on the game. "Save" is an item for saving a condition of progress of a game story, and non-selective in replay reproduction. "Game End" is an item for interrupting the game to return to the main title. "Percentage" is an item for displaying a percentage of current achievement of the game. It is noted that, during the game, respective buttons of left first pushdown button/left second pushdown button/right first pushdown button/right second pushdown button/select button/start button can be concurrently pressed for several seconds to effect a software reset for returning to the main title.

When the "Option" item is selected from the main menu or pause menu, an option menu is displayed. This option menu has "Vibration", "Display", "Window", "Wallpaper", "Text & Frame", "Default", and "Manual" items prepared therein. The "Vibration" item is an item for setting ON/OFF of operation of the vibration generating mechanism of the controller 20, and the "Display" item is an item to be used when changing a setting of display on the monitor screen. The "Window" item is an item for settings on a window to be displayed on the monitor screen. In the "Window" item, there are prepared a "Wide" item for settings of a so-called wide television, "Standard" item for settings of a standard television, a "Zoom" item for settings of a zoom image frame, a "Full" item for a setting to display an entirety by the zoom image frame, and a "Free" item for free settings. The "Wallpaper" item is an item for turning a wallpaper setting ON/OFF to effect a switching between an ON setting to display a wallpaper and an OFF setting not to display the wallpaper. The "Text & Frame" item is an item for settings of a text and a text frame, and has prepared therein a "Text & Frame" item for displaying both text and text frame, a "Text" frame for displaying the text only, and an "OFF" item for displaying neither. The "Default" item is an item is for resetting the screen display to an initial setting. The "Manual" item is an item for displaying on the monitor screen those functions which are allotted to the buttons of the controller 20.

In the "Option" item, if for example the "Display" item is selected and additionally the "Full" item of the "Window"

item is selected, there can be made a free setting of window display of the game image frame. Further, by selection of a desirable window to be operated by the "Δ" button and by use of "Up", "Down", "Left", and "Right" direction keys and the left first pushdown button, left second pushdown button, right first pushdown button, and right second pushdown button, respective window conditions can be set. For example, there can be set an window expansion by the left first pushdown button, a window compression by the left second pushdown button, a window deformation by the right first pushdown button or right second pushdown button and the direction keys, and a window position displacement by the direction keys. Moreover, it is possible by pressing the "○" button to establish a setting at the time, and by pressing the "×" button for cancellation of the setting to return to a setting before the change. Further, it is possible by pressing the select button to return to an initial setting, and by pressing the "□" button to have an operational explanation displayed on the monitor screen. After those settings, the is "Δ" button can be pressed to finish the setting of the "Option" item, and the "×" button can be pressed to cancel the setting of the "Option" item.

How to Progress the Game

Once the present embodiment of video game is started, the game story automatically progresses, having story branching points all provided with limit times. As described, the story branching points have hidden selective branches not displayed on the monitor screen in some cases, and those displayed thereon in the remaining cases. When selective branches are displayed on the way of story, any branch is selective by the "Up", "Down", "Left", and "Right" direction keys or the right first pushdown button/right second pushdown button, to be decided by the "○" button or the left first pushdown button. Depending on which one of the selective branches is selected, the development of story is influenced. Moreover, as described, the present embodiment of video game is programmed such that, in the case a story branching point is hidden and has selective branches not displayed on the monitor screen, if the search system is started by pressing down the "Δ" button in a timing considered to be optimum by the player, and if the story branching point is hit in the way the before-mentioned indication on the search bar is moving for example from the left to the right, then the flow is allowed to jump to a new branch destination. Further, as described, the present embodiment of video game is programmed such that, during progress of the story, the hint mark is indicated in a right lower part of the monitor screen, notifying the player of a story branching point existing therearound. However, as described, the hint mark is not indicated for all of the hidden story branching points, but for about eighty percent thereof. It is noted that in such a case that the present embodiment of video game is divided for example into a first and a second volume, if the "New Game" item of the main menu of the second volume is selected or when having started the play by the "Data Load" item, there is indicated a paging mark at a briefing part of the first volume to be reproduced in a preamble of the second volume. By pressing the "○" button or the left first pushdown button against the paging mark, the story can be progressed forward.

Handling Bad Point (Bad Level) in the Game

As described, the present embodiment of video game is programmed such that the development of story is influenced in dependence on a value of bad point (bad level) That is, when a particular selective branch is selected among displayed selective branches on the monitor screen or if a search for a hidden story branching point is failed, then the bad point is increased (the bad level ascends), causing the subsequent story branching to g worse. As the value of bad point is increased, the search bar has a changed color in an order of green→yellow-green→yellow→orange→red, with an increased tendency to arrive at a bad end. However, in order to reach a worst conclusion (obtain an achievement of a 100% bad level), there is provided also story branching points needing an intentional level rise.

Saving Condition of Game Progress

In the present embodiment of video game, if the "Save" item is selected on the pause menu to be displayed by pressing the start button in the game or if the game has come an ending, the condition of progress of the story is saved in the memory card applied to the memory card slot. By loading the saved data, a continuation can be played from a particular part just before the saving. If a data saved after the ending is loaded, the game starts from a start of the story.

Ending of Game

The present embodiment of video game has a variety of endings prepared therein corresponding to combinations of selections of selective branches. At the time of ending, there is displayed an achievement percentage of the video game on the monitor screen. The achievement percentage represents the degree of how many story branching points existing in the story has been passed, in terms of percentage. In the present embodiment of video game, as the start button is pressed in the game and the pause menu is entered, it also is possible by selecting the "Percentage" item to check a current value of the achievement percentage in a real time manner. It is noted that, in order to store the achievement percentage as well as play information at the time of an ending, it is necessary to save the data in the memory card after the ending. In the case a data up to an ending is saved in the memory card, the "×" button can be pressed in the second or later play to thereby skip a part that was passed in the previous game. It however is impossible to skip selective branches or those parts which are first to be passed.

Concrete Flow of Video Game

Figure 9:
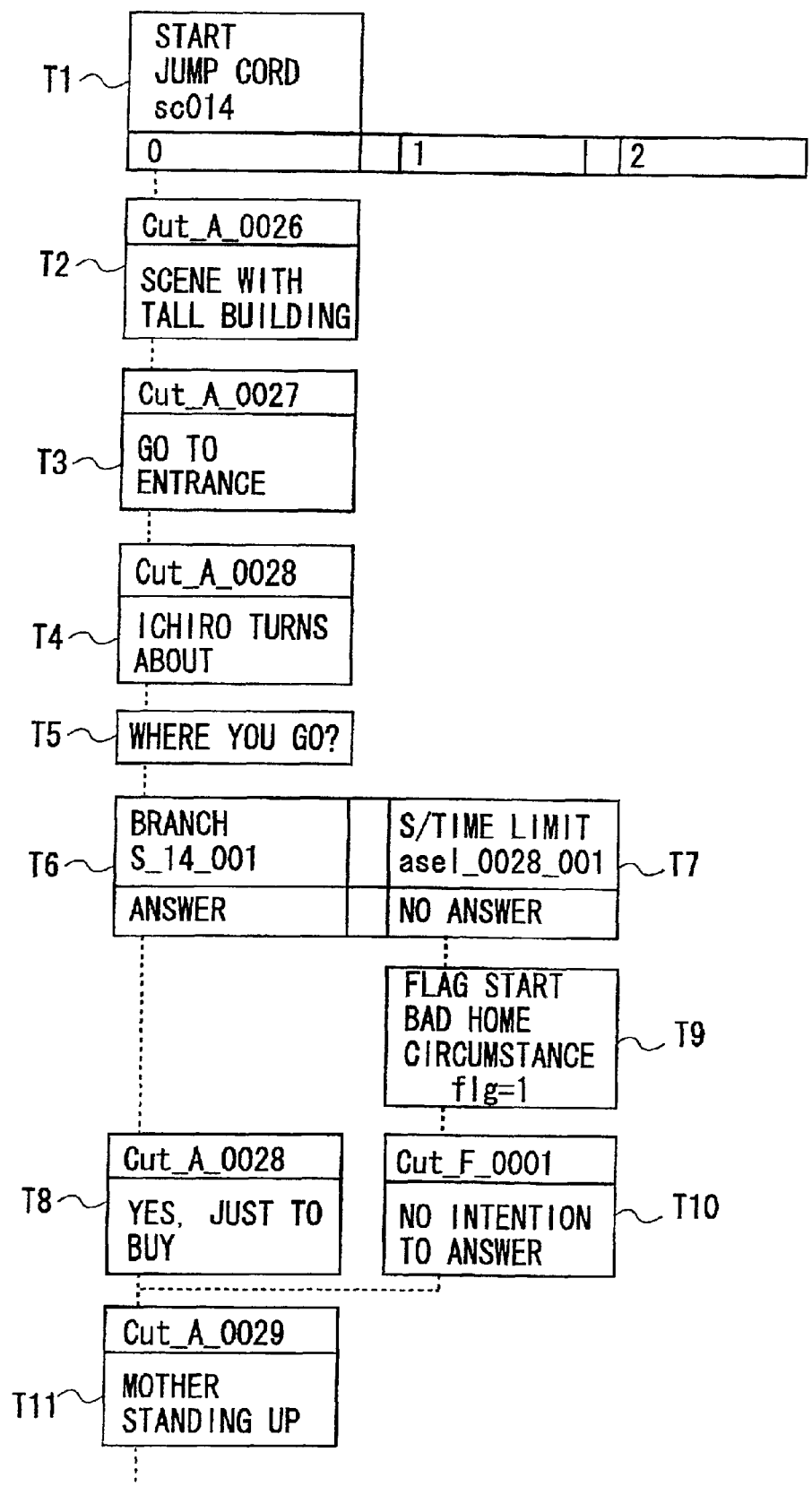
FIG. 9 is a diagram showing the flow of a concrete example of video game of the embodiment, for explanation from a start of a scene no. sc014 to a cut no. Cut_A_0029 thereof.
Figure 10:
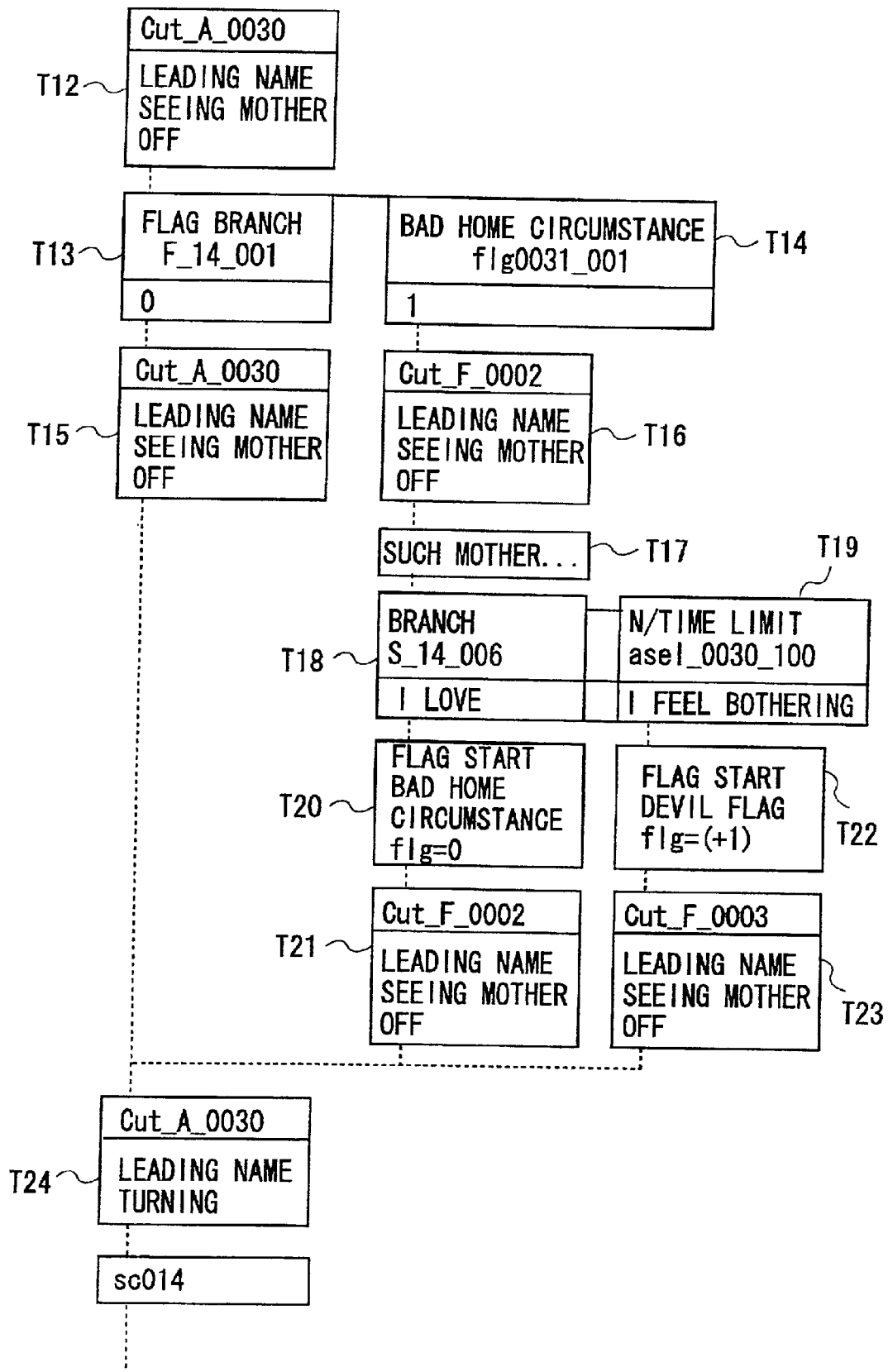
FIG. 10 is a diagram showing the flow of the concrete example of video game of the embodiment, for explanation from a cut no. Cut_A_0030 of the scene no. sc014 to an end of the scene no. sc014.
Figure 11:
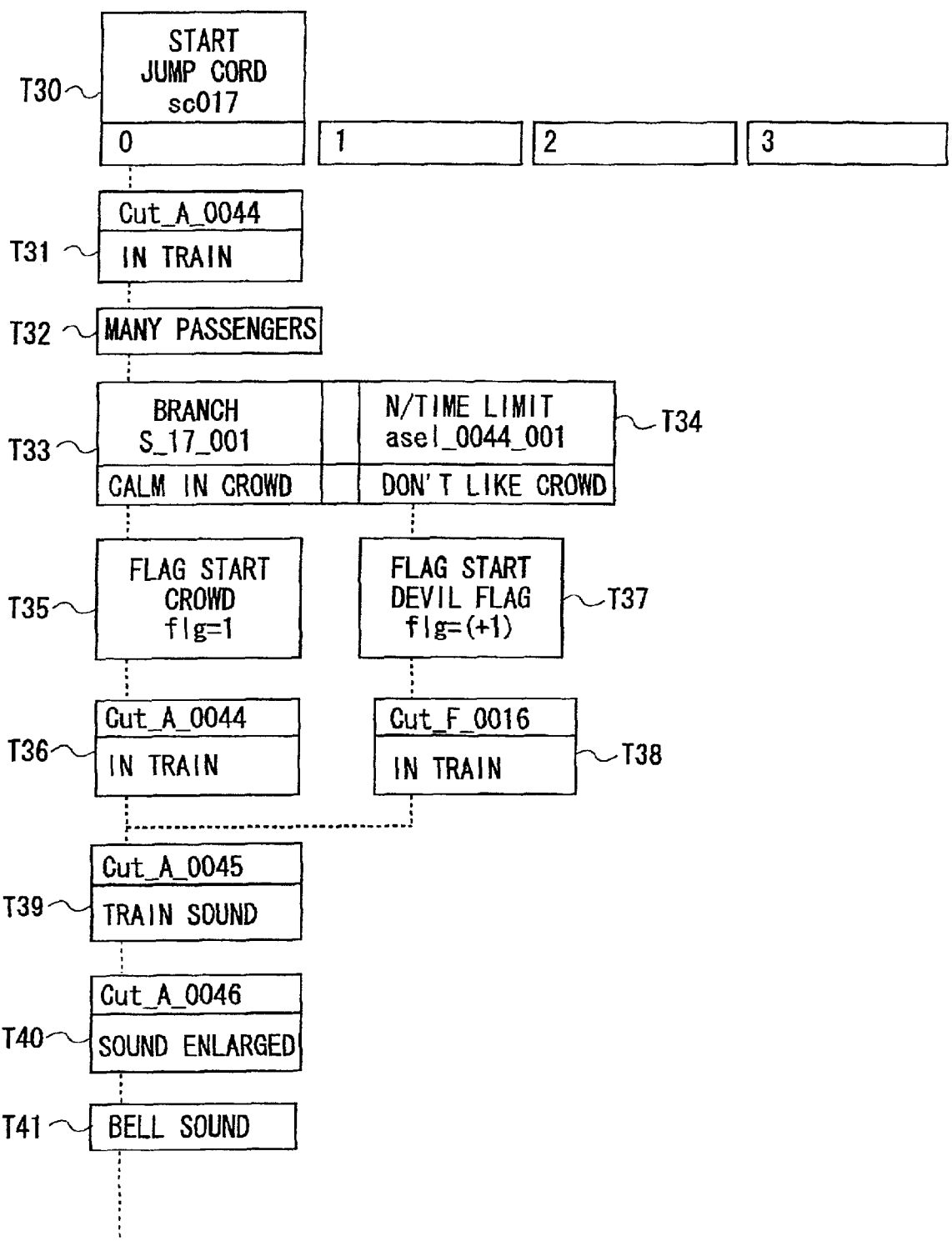
FIG. 11 is a diagram showing the flow of the concrete example of video game of the embodiment, for explanation from a start of a scene no. sc017 to a cut no. Cut_A_0046 thereof.
Figure 12:
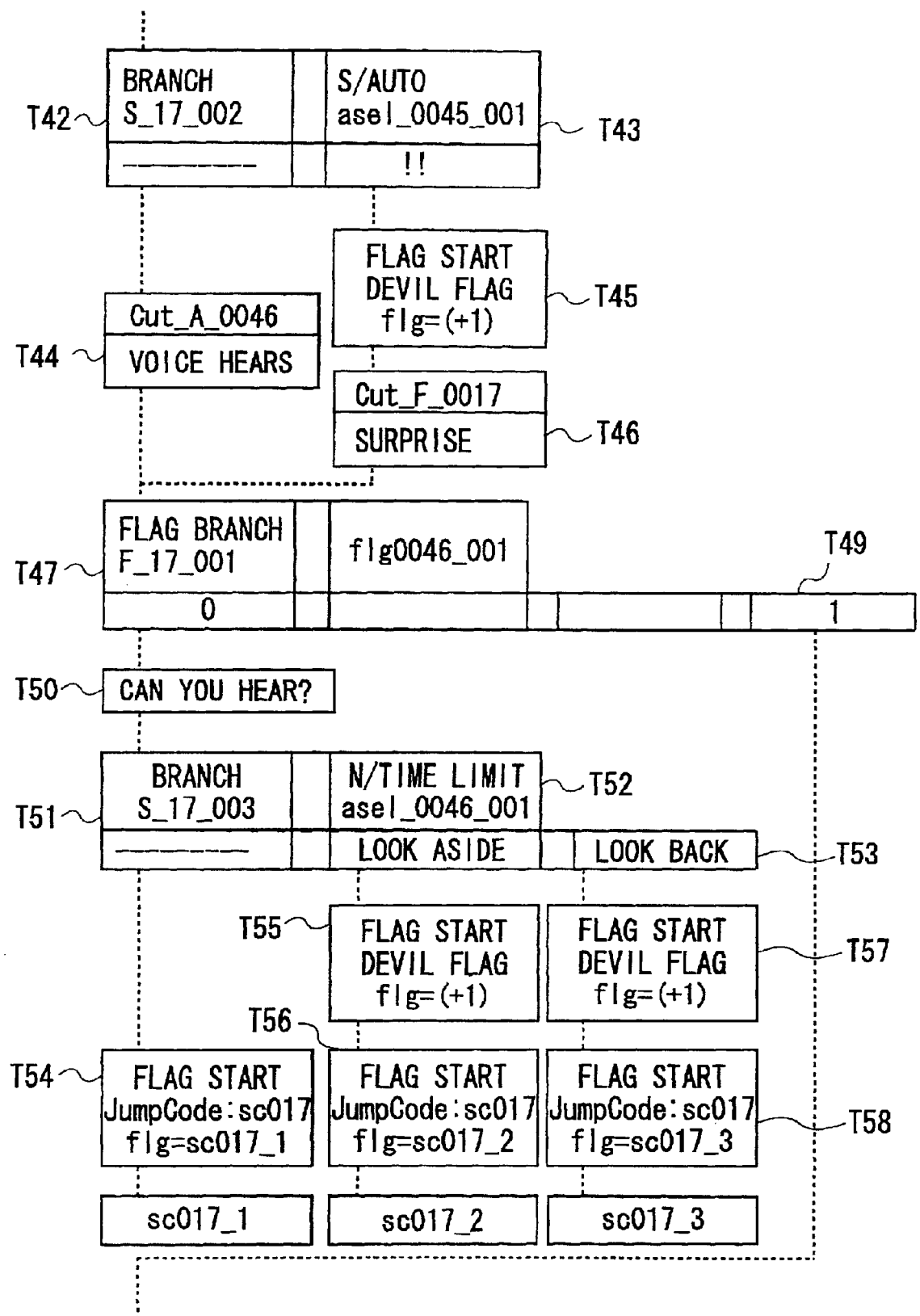
FIG. 12 is a diagram showing the flow of the concrete example of video game of the embodiment, for explanation from a story branching point S_17_002 of the scene no. sc017 to an story branching point S_17_003 thereof.
Figure 13:
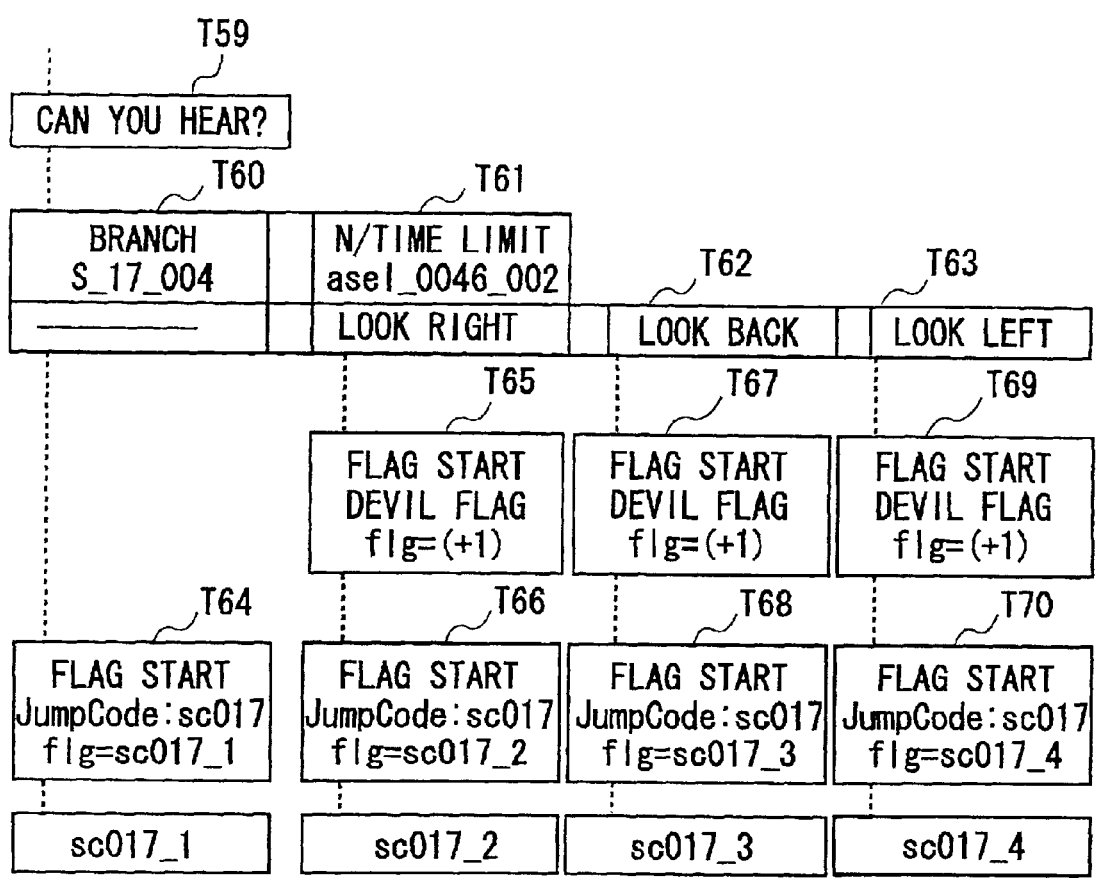
FIG. 13 is a diagram showing the flow of the concrete example of video game of the embodiment, for explanation from a story branching point S_17_004 to an end of the scene no. sc017.

Concrete description will now be made of how an actual progress of video game is lead by the before-mentioned hidden branching points in the present embodiment of video game with reference to FIG. 9 to FIG. 13. It is noted that the video game illustrated below is given as an example of such a part of game that, for example, whether a leading game character is to become a devil or can remain as it is a normal human is progressed by right or wrong of a search for a story branching point by the player. FIG. 9 and FIG. 10 show a flow from a cut (for example, cut no. Cut_A_0026) in the way of a scene (for example, scene no. sc014) in the way of the present embodiment of video game, and FIG. 11 to FIG. 13 show a flow from a cut (for example, cut no. Cut_A_0044) in the way of a scene (for example, scene no. sc017) in the way of the present embodiment of video game.

First, in FIG. 9, after a story of a scene no. sc014 has started, in the cut of cut no. Cut_A_0026 at T2, there is displayed on the monitor screen a scene in which for example a tall building is seen. It is noted that, in the case of this example, the story of the scene no. sc014 has prepared therein, besides a story of a scene no. sc014_0, stories of scene nos. sc014_1 and sc014_2 as well, while the description is simply made of the story of the scene no. sc014_0.

Next, in a cut of cut no. Cut_A_0027 at T3, there is displayed on the monitor screen a picture of a leading name (Ichiro) going to an entrance, and in a cut of cut no. Cut_A_0028 at T4, there is displayed a picture of the leading name Ichiro turning about. In this cut, at T5, there are output sounds of a mother asking the leading name a question "where you go?". In the present embodiment of video game, there is hidden in this part of inquiry a story branching point S__14__001 with label no. asel__0028__001 for example. That is, at the story branching point S__14__001 with label no. asel__0028__001, there are hidden selective branches for a case giving an answer to the inquiry from the mother as shown at T6, and for a case giving no answer as shown at T7.

In the case in which the search system is started by the player pressing the "Δ" button and the story branching point S__14__001 is detected, the selective branch at T6 is automatically selected, but in the case of a failed search (as the search system is not started, or as the detection is failed by an end of the search time though the search system is started), the selective branch at T7 is automatically selected.

In a successful search having automatically selected the selective branch at T6, the flow goes to a cut of cut no. Cut__A__0028 at T8, where the leading name give an answer "Yes, just to buy . . . ". On the other hand, in the failed search having automatically selected the selective branch at T7, a flag starts as shown at T9, setting up "1" as a flag (flag=1) showing a bad home circumstance, and further the flow goes to a cut of cut no. Cut__F__0001 as shown at T10, where the leading name gives no answer, muttering "no intention to answer" in the mind. Thereafter, the flow goes to a cut of cut no. Cut__A__0029 at T11, where a picture is displayed of the leading name's mother standing up to go another room.

Next, as shown in FIG. 10, the flow goes to a cut of cut no. Cut__A__0030 at T12, where a picture is displayed of the lading name seeing the mother off. In the present embodiment of video game, this part of cut no. Cut__A__0030 has, as shown at T13, a flag branching point F__14__001 set for branching the story in accordance with a value of flg no. flg0031__001 having been already set. It is noted that this flag branching point is a flag branching point free from influences of whether or not the search system is started. At the flag branching point F__14__001, if the flag already set is "0", the cut of cut no. Cut__A__0030 at T12 is maintained at T15. On the other hand, at the flag branching point F__14__001, if the flag already set is "1", the flow goes to a cut of cut no. Cut__F__0002 at T16, where a picture is displayed of the leading name seeing the mother off, and as shown at T17, there is output a mind's voice "such mother . . . " representing the leading name's heart.

Moreover, in the present embodiment of video game, at the part of the mind's voice representing the heart at T17, there is hidden a story branching point S__14__006 with label no. asel__0030__001 for example. That is, at the story branching point S__14__006 with label no. asel__0030__001 for example, there are hidden selective branches for a case outputting a mind's voice "I love" representing the leading name's heart to the mother as shown at T18, and for a case outputting a mind's voice "I feel bothering" representing the leading name's heart to the mother as shown at T19.

In the case in which the search system is started by the player pressing the "Δ" button and the above story branching point is detected, the selective branch at T18 is automatically selected, but in the case of a failed search, the selective branch at T19 is automatically selected.

In a successful search having automatically selected the selective branch at T18, a flag starts as shown at T20, setting up a flag "0" showing a bad home circumstance, and the flow goes to a cut of cut no. Cut__F__0002 at T21, where a picture is displayed of the leading name seeing the mother off. On the other hand, in the failed search having automatically selected the selective branch at T19, a devil flag starts as shown at T21 and the bad point is incremented by 1, then the flow goes to a cut of cut no. Cut__F__0003 at T23, where a picture is displayed of the leading name seeing the mother off.

Then, as shown at T24, the flow goes to a cut of cut no. Cut_A__0031, where a picture is displayed of the leading name tuning, and thereafter the scene of scene no. sc014 finishes.

Next, in FIG. 11, after the story of the scene no. sc017 has started, in the cut of cut no. Cut__A__0044 at T31, there is displayed on the monitor screen a scene in an electric train. It is noted that, in the case of this example, the story of the scene no. sc017 has prepared therein, besides a story of a scene no. sc017__0, stories of scene nos. sc017__1, sc017__2 and sc017__3 as well, while the description is simply made of the story of the scene no. sc017__0.

Next, at T32, the leading name mutters "Many passengers" in the mind. In the present embodiment of video game, there is hidden in this part of a mutter of the leading name a story branching point S__17__001 with label no. asel__0044__001 for example. That is, at the story branching point S__17__001 with label no. asel__0044__001, there are hidden selective branches for a case outputting a voice of mind "Calm in the crowd!" representing the heart of the leading name as well as the leading name's mutter as shown at T33, and for a case outputting a voice of mind "I don't like the crowd" as shown at T34.

In the case in which the search system is started by the player pressing the "Δ" button and the story branching point S__17__001 is detected, the selective branch at T33 is automatically selected, but in the case of a failed search, the selective branch at T34 is automatically selected.

In a successful search having automatically selected the selective branch at T33, a crowd flag starts, setting up "1", as shown at T35, and thereafter the flow again goes to a picture of the cut of cut no. Cut__A__0044 as shown at T36. On the other hand, in the failed search having automatically selected the selective branch at T34, a devil flag starts as shown at T37, incrementing the bad point by 1, and thereafter the flow goes to a picture in train of a cut of cut no. Cut__F__0016 as shown at T38.

Thereafter, as shown at T39, the flow goes to a cut of cut no. Cut__A__0045, where a train sound is output, and thereafter, as shown at T40, the flow goes to a cut of cut no. Cut__A__0046, where the train sound is enlarged. In addition, for example, a bell sound is then output at T41. In the present embodiment of video game, in the part of this bell sound, there is hidden a story branching point S__17__002 with label no. asel__0045__001 for example as shown at T42 and T43 in FIG. 12. That is, at the story branching point S__17__002 with label no. asel__0045__001 for example, there are hidden selective branches for a case of the leading name being left as it is in a condition as shown at T42, and for a case sensing a sign of something as shown at T43.

Then, in the case in which the search system is started by the player and the story branching point S__17__002 is detected, the selective branch at T42 is automatically selected, but in the case of a failed search, the selective branch at T43 is automatically selected.

In a successful search having automatically selected the selective branch at T42, there is output a voice mixed in the train sound, as shown at T44. On the other hand, in the failed search having automatically selected the selective branch at T43, a devil flag starts as shown at T45, incrementing the bad point by 1, and thereafter the flow goes to a cut of cut no. Cut__F__0017 as shown at T46, where a picture is displayed of the leading name sensing, surprising at, a sign of something.

Next, in the present embodiment of video game, the part of cut nos. Cut_A_0046 and Cut_F_0017 has, as shown at T47, a flag branching point F_17_001 set for branching the story in accordance with a value of flg no. flg0046_001 having been already set. At the flag branching point F_17_001, if the flag already set is "0", there is output at T50 a voice calling "Can you hear?" from somewhere. On the other hand, at the flag branching point F_17_001, if the flag already set is "1", then as shown at T49, the flow goes to T59 of FIG. 13.

In the present embodiment of video game, at the part outputting the voice "Can you hear?", there is hidden a story branching point S_17_003 with label no. asel_0046_001 for example. That is, at the story branching point S_17_003 with label no. asel_0046_001, there are hidden selective branches for a case of the leading name left as it is in a condition unable to aware of the above-noted voice as shown at T51, for a case being aware of the voice to look aside as shown at T52, and for a case being aware of the voice to look back as shown at T53.

Then, in the case in which the search system is started by the player and the story branching point S_17_003 is detected, the selective branch at T54 is automatically selected, but in the case of a failed search, the selective branch at T52 or T53 is automatically selected.

In a successful search having automatically selected the selective branch at T54, a flag of a jump code to a scene subsequent to the scene no. sc017_1 starts at T54, finishing this scene. On the other hand, in the failed search having automatically selected the selective branch at T52, a devil flag starts as shown at T55, incrementing the bad point by 1, and thereafter, at T56, a flag of a jump code to a scene subsequent to the scene no. sc017_2 starts, finishing this scene. Likewise, in the failed search having automatically selected the selective branch at T53, a devil flag starts as shown at T57, incrementing the bad point by 1, and thereafter, at T58, a flag of a jump code to a scene subsequent to the scene no. sc017_3 starts, finishing this scene.

If the flow goes to T59 of FIG. 13, there is again output the voice calling "Can you hear?" from somewhere. In the present embodiment of video game, at the part again outputting the voice "Can you hear?", there is hidden a story branching point S_17_004 with label no. asel_0046_002 for example. That is, at the story branching point S_17_004 with label no. asel_0046_002, there are hidden selective branches for a case of the leading name left as it is in a condition unable to aware of the above-noted voice as shown at T60, for a case being aware of the voice to look right as shown at T61, for a case being aware of the voice to look back as shown at T62, and for a case being aware of the voice to look left as shown at T63.

Then, in the case in which the search system is started by the player and the story branching point S_17_004 is detected, the selective branch at T60 is automatically selected, but in the case of a failed search, the selective branch at any one of T61 to T63 is automatically selected.

In a successful search having automatically selected the selective branch at T60, a flag of a jump code to a scene subsequent to the scene no. sc017_1 starts at T64, finishing this scene. On the other hand, in the failed search having automatically selected the selective branch at T61, a devil flag starts as shown at T66, incrementing the bad point by 1, and thereafter, at T56, a flag of a jump code to a scene subsequent to the scene no. sc017_2 starts, finishing this scene. Likewise, in the failed search having automatically selected the selective branch at T62, a devil flag starts as shown at T67, incrementing the bad point by 1, and thereafter, at T68, a flag of a jump code to a scene subsequent to the scene no. sc017_3 starts, finishing this scene. Further, in the failed search having automatically selected the selective branch at T63, a devil flag starts as shown at T69, incrementing the bad point by 1, and thereafter, at T70, a flag of a jump code to a scene subsequent to the scene no. sc017_4 starts, finishing this scene.

In the present embodiment of video game, the story is progressed and branched in a manner concretely described hitherto, thereby allowing various story developments and endings to be enjoyed.

Description of the foregoing embodiments is for illustrative purposes. The present invention is not limited to the embodiments described, and it is to be understood that changes and variations, such as by designs, may be made without departing from the scope of a technical concept according to the invention. For example, the point to be dependent on whether a search for a hidden story branching point may be, not simply a bad point, but also a good point, and also search bar operations, colors and the like may not be limited to the embodiments described. Moreover, the present invention is not limited to a video game, but may preferably have other applications, for example, an application to educational software using a personal computer, making a search for a hidden selective branch (such as a right answer) to increment or decrement a mark, or an application to an internet having a hidden URL or the like provided on a home page, responding simply to a hit to the URL, by jumping to another page or another link destination.

What is claimed is:

1. A story branching control method for a video game whose content of a story is branched in accordance with a player's instruction, comprising the steps of:

providing a branching point selectable by a user for determining a flow of the story;

receiving a search instructing input for searching for the branching point;

searching for the branching point for a predetermined period of time after receiving the search instructing input;

determining whether the branching point exists during the predetermined period of time after receiving the search instructing input; and determining a branch destination of the story in accordance with a success or failure of determining whether the branching point exists during the predetermined period of time.

2. The story branching control method according to claim 1, further comprising the step of:

setting a predetermined variant value for use in the determination of the branch destination in accordance with the result of the determining whether the branching point exists during the predetermined period.

3. The story branching control method according to claim 2, further comprising the steps of:

incrementing a number after the determining step; and setting a value of the incremented number as the predetermined variant value.

4. The story branching control method according to claim 2, further comprising the step of:

determining the branch destination in accordance with the predetermined variant value.

5. The story branching control method according to claim 4, further comprising the step of:

determining the branch destination in accordance with the variant value set by an initial value of a predetermined variant or in accordance with the result of the determining whether the branching point exists during the predetermined period, when the branching point to have been reached is detected by the flow of story within a period excluding the predetermined period of time.

6. The story branching control method according to claim 1, further comprising the step of:

setting a predetermined flag in accordance with the result of the determining whether the branching point exists during the predetermined period.

7. The story branching control method according to claim 6, further comprising the step of:

determining the branch destination in accordance with the predetermined flag.

8. The story branching control method according to claim 1, further comprising the step of:

generating a predetermined search notification signal for notifying the search being made, simply within the predetermined period of time from the search instructing input.

9. The story branching control method according to claim 1, further comprising the step of:

generating, when the branching point to have been passed is detected by the flow of information within a period excluding the predetermined period of time, a predetermined pass notification signal for notifying the branching point to have been passed.

10. The story branching control method according to claim 9, further comprising the step of:

generating the predetermined pass notification signal, simply when the branching point to have been passed is a predetermined one of whole branching points set on the way of the flow of story.

11. A story branching control method for a video game whose content of a story is branched in accordance with a player's instruction, comprising the steps of:

providing a current branching point selectable by the player for determining a flow of the story;

receiving a search instructing input of the player for searching for the current branching point;

determining whether the current branching point exists after receiving the search instruction input; and determining a branch destination of the story in accordance with a predetermined variant value, wherein the predetermined variant value is determined as a function of a prior success or failure in determining whether a previous branching point existed after receiving a previous search instruction input.

12. A notification signal generating method for a video game whose content of a story is branched in accordance with a player's instruction, comprising the steps of:

providing a branching point searchable by the player for determining a flow of the story; and generating, when having passed the branching point by the flow of the story without having received a search instructing input of the player, a predetermined pass notification signal notifying the branching point to have been passed.

13. The notification signal generating method according to claim 12, further comprising the step of:

generating the predetermined pass notification signal, simply when the branching point to have been passed is a predetermined one of whole branching points set on a way of the flow of the story.

14. A program executing apparatus for executing processing program whose content of a story is branched in accordance with a player's instruction, comprising:

search instructing input detecting means for detecting an input of a search instructing input by the player;

searching means for searching for a branching point provided on a way of a flow of the story, for a predetermined period of time from detecting the search instructing input;

branch point determining means for determining whether the branching point exists during the predetermined period of time after detecting the search instructing input; and branch destination determining means for determining a branch destination of the story in accordance with a success or failure of the branch point determining means in determining whether the branching point exists during the predetermined period of time.

15. A recording medium having recorded therein a processing program whose content of a story is branched in accordance with a player's instruction, the processing program comprising and making a computer execute the steps of:

detecting an input of a search instructing input by the player;

searching for a branching point provided on a way of a flow of the story, for a predetermined period of time from detecting the search instructing input;

determining whether the branching point exists during the predetermined period of time after detecting the search instructing input; and determining a branch destination of the story in accordance with a success or failure of determining whether the branching point exists during the predetermined period of time.

16. A computer with a memory storing a processing program whose content of a story is branched in accordance with a player's instruction, the processing program comprising and making the computer execute the steps of:

detecting an input of a search instructing input by the player;

searching for a branching point provided on a way of a flow of story, for a predetermined period of time from detecting the search instructing input;

determining whether the branching point exists during the predetermined period of time after detecting the search instructing input; and determining a branch destination of the story in accordance a success or failure of determining whether the branching point exists during the predetermined period of time.

* * * * *

UNITED STATES PATENT AND TRADEMARK OFFICE
CERTIFICATE OF CORRECTION

PATENT NO.        : 6,966,831 B2
APPLICATION NO. : 09/993345
DATED             : November 22, 2005
INVENTOR(S)       : Kazuhiko Miyaki It is certified that error appears in the above-identified patent and that said Letters Patent is hereby corrected as shown below:

Claim 16 column 20, line 56: "-in accordance a success-" should be changed to --in accordance with a success--.

Signed and Sealed this

Tenth Day of April, 2007

JON W. DUDAS
*Director of the United States Patent and Trademark Office*